United States Patent [19]

Sharma et al.

[11] Patent Number: 4,597,970

[45] Date of Patent: Jul. 1, 1986

[54] CHEWING GUM COMPOSITIONS CONTAINING NOVEL SWEETENER DELIVERY SYSTEMS AND METHOD OF PREPARATION

[75] Inventors: Shri C. Sharma, Mendham; Robert K. Yang, Morris Plains, both of N.J.

[73] Assignee: Warner-Lambert Company, Morris Plains, N.J.

[21] Appl. No.: 658,099

[22] Filed: Oct. 5, 1984

[51] Int. Cl.⁴ .............................................. A23G 3/30
[52] U.S. Cl. ...................................... 426/5; 426/548; 426/658; 426/453
[58] Field of Search ........................... 426/96, 99, 3-6, 426/548, 658, 305, 307, 650, 651, 453

[56] References Cited

U.S. PATENT DOCUMENTS

| | | | |
|---|---|---|---|
| 3,362,829 | 1/1968 | Landfried et al. | 426/99 |
| 3,389,000 | 6/1968 | Fujita et al. | 426/99 |
| 3,443,959 | 5/1969 | Ciboit | 426/453 |
| 3,527,647 | 9/1970 | Hager | 426/453 |
| 3,647,480 | 3/1972 | Cermak | 426/99 |
| 3,753,739 | 8/1973 | Cella et al. | 426/548 |
| 3,867,556 | 2/1975 | Darragh | 426/99 |
| 3,928,633 | 12/1975 | Shoaf et al. | 426/96 |
| 3,943,258 | 3/1976 | Bahoshy et al. | 426/3 |
| 3,947,600 | 3/1976 | Rousseau | 426/548 |
| 3,949,094 | 4/1976 | Johnson | 426/99 |
| 3,956,507 | 5/1976 | Shoaf et al. | 426/96 |
| 3,976,794 | 8/1976 | Johnson et al. | 426/307 |
| 3,982,023 | 9/1976 | Bahoshy et al. | 426/3 |
| 4,001,456 | 1/1977 | Glicksman et al. | 426/548 |
| 4,036,992 | 7/1977 | Bahoshy et al. | 426/3 |
| 4,059,706 | 11/1977 | Pischke et al. | 426/548 |
| 4,105,801 | 8/1978 | Dogliotti | 426/99 |
| 4,122,195 | 10/1978 | Bahoshy et al. | 426/548 |
| 4,139,639 | 2/1978 | Bahoshy et al. | 426/3 |
| 4,246,286 | 1/1981 | Klose et al. | 426/3 |
| 4,293,572 | 10/1981 | Silva et al. | 426/307 |
| 4,374,858 | 2/1983 | Glass et al. | 426/3 |
| 4,382,924 | 5/1983 | Berling | 426/548 |
| 4,384,004 | 5/1983 | Cea et al. | 426/548 |
| 4,465,694 | 8/1984 | Okada | 426/3 |

FOREIGN PATENT DOCUMENTS 0053844  6/1982  European Pat. Off. ............ 426/548

Primary Examiner—Jeanette Hunter
Attorney, Agent, or Firm—Daniel A. Scola, Jr.; Gary M. Nath

[57] ABSTRACT

A chewing gum composition comprising a gum base and an agglomerated sweetener delivery system capable of effecting a controlled release of core material comprising:

(A) at least one natural or artificial core material selected from the group consisting of amino acid based sweeteners, dipeptide sweeteners, glycyrrhizin, saccharin and its salts, acesulfame salts, cyclamates, steviosides, talin, dihydrochalcone compounds, flavoring agents and mixtures thereof; and (B) a hydrophobic matrix consisting essentially of
  (i) lecithin; and
  (ii) an edible material having a melting point in the range of about 25° C. to about 100° C. selected from the group consisting of (a) fatty acids having an iodine value of about 1 to about 10, (b) natural waxes, (c) synthetic waxes and (d) mixtures thereof; and
  (iii) at least one glyceride.

23 Claims, 4 Drawing Figures

CHEWING GUM COMPOSITIONS CONTAINING NOVEL SWEETENER DELIVERY SYSTEMS AND METHOD OF PREPARATION

The present invention relates to chewing gum compositions containing a novel delivery system and method of preparation. More particularly this invention relates to a method of protecting materials from being adversely affected from such factors as moisture, pH, temperature and reactive chemicals. The delivery system is most useful for core materials such as sweeteners which are particularly unstable in the presence of these factors. In particular, the delivery system is especially useful for dipeptide sweeteners such as aspartame which are known to present stability problems, flavoring agents and the like.

Dipeptide sweeteners such as L-aspartyl-L-phenylalanine methylester (aspartame) have been widely recognized as an extremely good-tasting non-caloric sweetener for use in a variety of food products, among which are chewing gum products. Unfortunately, aspartame is extremely unstable in the presence of moisture and undergoes hydrolytic degradation and subsequent loss of sweetness. Elevated temperatures and specific pH ranges may accelerate the hydrolytic degradation. Additionally, aspartame is known to react with a number of flavorings and chemicals such as aldehydes and ketones. For example, aspartame loses its sweetness due to chemical reactions in the presence of flavor aldehyde-containing oils such as cinnamon. These flavor oils are used in food products and are popular in chewing gum and other confectionery products. These compositions also generally contain moisture and may be exposed to elevated temperatures during their shelf-life. The result is the loss of aspartame and the corresponding loss of sweetness contributed thereby in the gum.

Numerous attempts have been made to stabilize aspartame in chewing gums as well as other food products. U.S. Pat. No. 4,384,004 to T. Cea et al., discloses solid particles of aspartame encapsulated by a coating material selected from the group consisting of cellulose, cellulose derivatives, arabinogalactin, gum arabic, polyolefins, waxes, vinyl polymers, gelatin, zein and mixtures thereof, wherein the amount of said coating material to said methyl ester is from 1:1 to 1:10. More particularly, the coating materials include cellulose, methyl cellulose, ethyl cellulose, cellulose nitrate, cellulose acetate phthalate, carboxymethyl cellulose, hydroxyethyl cellulose, hydroxypropyl cellulose, arabinogalactan; polyethylene, polymethacrylates, polyamides, ethylenevinyl acetate copolymers, polyvinylpyrrolidone; gum arabic; paraffin wax, carnauba wax, spermaceti, beeswax; stearic acid, stearyl alcohol, glyceryl stearate; gelatin, zein and mixtures thereof.

The method of coating employed in this reference involves suspending the aspartame particles in a stream of air that passes through a zone of atomized liquid droplets of the coating material, so that the coating material is deposited on the surface of the aspartame. More than one coating may be used whereby the inner coating is water-soluble and the outer coating is water-insoluble.

U.S. Pat. Nos. 4,122,195 and 4,139,939, both to Bahoshy et al., fix aspartame by preparing it with a material such as gum arabic or the reaction product of a compound containing a polyvalent metallic ion, with an ungelatinized starch acid-ester of a substituted dicarboxylic acid, by a spray drying technique, where the aspartame and a film former are prepared in an emulsion.

U.S. Pat. No. 4,374,858, to Glass et al., discloses an aspartame sweetened chewing gum having improved sweetness stability wherein the chewing gum piece has aspartame coated on its surface, as opposed to incorporating it in the chewing gum mix.

EPA No. 81110320.0, published June 16, 1982 (Publication No. 0053844), to Ajinomoto Co., Inc., discloses a stabilized dipeptide-based sweetening composition comprising (a) from 20 to 60% by weight of solid fat, (b) from 10 to 30% by weight emulsifier, (c) from 10 to 30% by weight polysaccharide and (d) not more than 30% by weight of dipeptide sweetener. The compositions are prepared by heating the mixture of the ingredients, cooling, and pulverizing to obtain powder or granules of the composition to obtain a ASTM mesh size of smaller than 12. Spray drying the mixture is also disclosed.

U.S. Pat. No. 4,105,801 to Degliotti, discloses a confectionery comprising a core portion and a shell adheringly enveloping the core portion, whereby the shell is formed by an intimate mixture of microcrystals of xylitol with a solid fatty substance in a proportion of 0.5 to 15 parts by weight of fatty substance to each 100 parts by weight of xylitol. The fatty substance is preferably a mono-, di- or triglyceride having a melting range of between 20° and 60° C.

U.S. Pat. No. 3,389,000 to Toyonaka et al., discloses protective coatings for granular nucleoside-5-phosphates, the coatings being edible fats melting between 40°–100° C. and derived from plants and animals. Hydrogenated oils such as soybean oil, cottonseed oil, almond oil, castor oil, linseed oil, mustard oil, olive oil, grapefruit seed oil, palm oil, palm kernel oil, rapeseed oil, rice bran oil and the like and mixtures thereof. This reference discloses a process of preparing the granular product from a liquid mixture of fats and nucleoside-5-phosphates which are sprayed from a pressure nozzle and the resultant granules cooled and recovered.

U.S. Pat. No. 4,382,924, to Berling, discloses liquid oral dosage forms for vitamins or pharmaceutical materials comprising an edible oil, a high potency lipid soluble sweetener such as saccharin and a lipid soluble flavorant. The edible oil may be a polyol fatty acid ester having at least four fatty acid ester groups and each fatty acid having from about 8 to about 22 carbon atoms. The oil, sweetener and flavor oil are mixed and heated and then cooled to provide a palatable liquid dosage form.

For a general discussion of spraying fatty materials onto sweeteners and the like see U.S. Pat. Nos. 3,949,094 and 3,976,794 both to Johnson, and U.S. Pat. No. 3,867,556 to Darragh. U.S. Pat. No. 4,293,572 to Silva et al., discloses the application of a dispersion of an emulsified fat with a solution of dextrin, saccharin or a polysaccharide to a food product as a barrier against moisture. U.S. Pat. No. 3,527,647 discloses a process of agglomerating particles by randomly scattering and spraying moistened particles to cause them to collide and form agglomerates.

The problem relating to stabilization of sweeteners such as aspartame, which has not been previously addressed, relates to the wettability of the aspartame crystal as well as to its morphological configuration. Aspartame is known to be rod-like, needle-like or dendritic in shape. As a result it is very difficult to coat aspartame using ordinary mixing or spray coating techniques. To be effective as protective barrier coatings must be able to wet and adhere to the crystalline surface, including the needle-like tips and other shape variations of the aspartame. Additionally, the coating must be capable of being applied in a film with a uniform thickness sufficient to provide a barrier against degradative factors such as moisture, pH changes, temperature changes and reactive chemicals. The coatings, in addition to being protective barriers, must be flexible enough to conform to the surface irregularities and geometrical configuration without cracking due to mechanical stresses which it is subjected to during incorporation of the sweetener into specific product applications. Attempts to coat aspartame using spray techniques to apply simple mixtures of fat and lecithin have resulted in poor wetting, spotty coating and inadequate protection against moisture and other potentially degradative factors.

It has been discovered, that simple mixing of known coating materials such as fats, with certain other core materials such as aspartame does not provide adequate protection to keep the core material in a stabilized state. Fats do not provide adequate coating materials, nor do such coating materials as starch, and certain other materials such as waxes. Many of these materials require solvents and moisture for application, which have adverse effects on the stability of hydrophilic instable materials such as aspartame. For example, simple mixing of aspartame in liquid mixtures of traditional coating materials, e.g., fat and lecithin has resulted in poor wetting, spotty coating and inadequate protection against moisture and chemicals. The result was degradation of the aspartame upon exposure to these conditions. Changes in pH and temperature catalyze these degradative conditions.

The process of EPA No. 81110320.9 (Publication No. 0053844) filed Dec. 10, 1981, discussed above, is an example of simple admixing of coating materials with aspartame. This publication discloses the simple melting and admixing of from 20 to 60% of solid fat, 10 to 30% of emulsifier, 10 to 30% of polysaccharide and not more than 30% dipeptide sweetener. The mixture is then cooled and pulverized or spray dried. The pulverizing into fine powder, however, results in rupturing of the coating, leaving the aspartame exposed. Spray drying is normally associated with the driving off of moisture or solvents.

The prior art techniques for coating difficult to coat materials such as aspartame, has focused on two methods. The first method involves the formation of a molten mixture of the coating material with the sweetener. The mixture is then solidified by cooling and pulverized. The resultant particles represent a random attempt at completely coating or enrobing the sweetener. In the case of aspartame, this coating does not provide adequate protection against moisture or aldehyde-containing flavor oils and instability of the aspartame results.

The second conventional prior art technique for coating materials involves fluidized bed spray coating. This technique involves suspending a mass of the material to be coated into a stream of atomized droplets of coating material. In the case of materials such as aspartame, this method is very difficult. Aspartame is a low density material, has a large surface to weight ratio and poor wetting characteristics. For these reasons, spray coating of aspartame in a fluidized bed system is difficult.

The instant process is an improvement over spray congealing techniques and includes additional coating steps. The resultant product exhibits a marked improvement in the effectiveness of the coating as a protective barrier. The result is a significant improvement in the stability of the core material. The examples discussed below, along with the microphotographs, clearly indicate that the instant process enables a uniform and thorough coating to be applied to a core material in complete contrast to the prior art techniques.

Thus, the delivery systems of the invention and process of preparation provide an improved protective coating for core materials. The delivery systems have a variety of other advantages including the controlled release of materials such as sweeteners and flavoring agents. Other advantages will become apparent herein.

The agglomerate was formed using the inventive spray congealing technique. The shape of the agglomerate facilitates the secondary exterior coating applied via the fluidized bed granulation technique.

Figure 1:
FIG. 1 is a picture of the crystalline sweetener aspartame (magnification 145X). The rod-like geometry is clearly visible.
Figure 2:
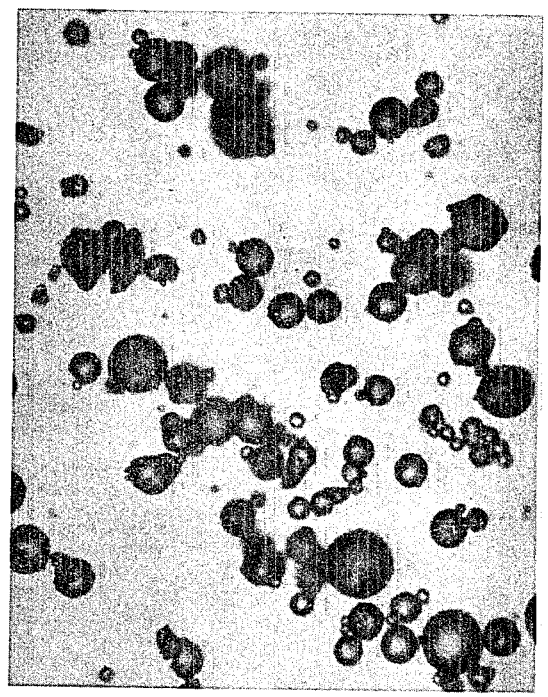
FIG. 2 is a picture of the agglomerate of aspartame and the hydrophobic matrix prior to application of the secondary coating. The spherical like appearance is clearly seen.
Figure 3:
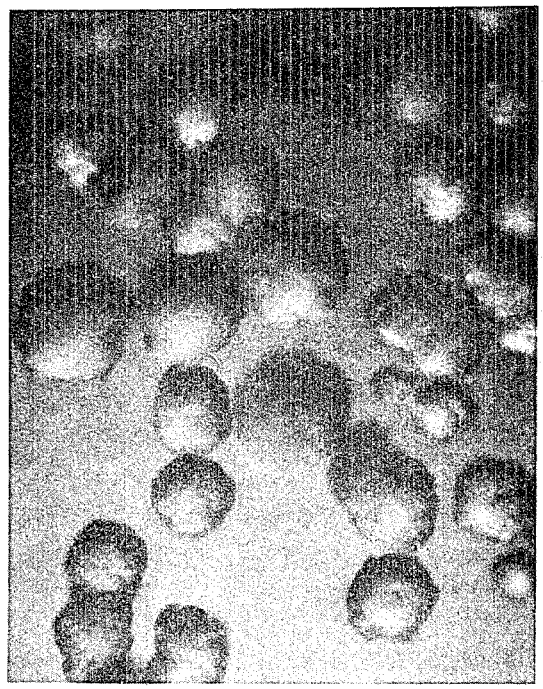

FIG. 3 is a picture of the inventive sweetener delivery system. (magnification 145X). These particles are the result of coating the agglomerate of FIG. 2 with 200% by weight of the agglomerate of a mixture of 95% hydrogenated palm oil and 15% paraffin wax.

Figure 4:
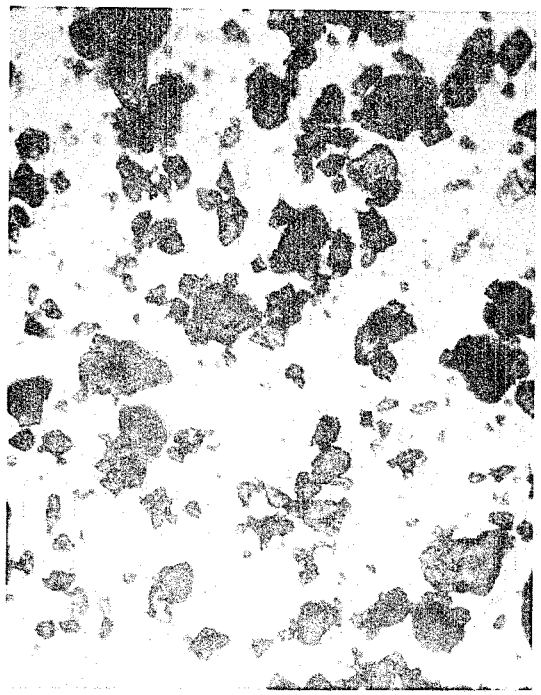

FIG. 4 is a picture of the sweetener delivery system (magnification 145X) as prepared by the method outlined in Example one EPA No. 81110320.9. The polysaccharide, however, was omitted and amounts of the ingredients were in the range of the instant invention. The method involved melting the ingredients of fat, lecithin aspartame and monoglyceride together and solidifying them by cooling. The solid was then pulverized to give the particles depicted in the photograph. As clearly seen in this picture, the particles are randomly and non-uniformly coated.

SUMMARY OF THE INVENTION

Although this invention contemplates a delivery system for a variety of core materials and combinations thereof, it is particularly directed to providing a novel delivery system for sweeteners such as aspartame and saccharin, flavoring agents and the like to be incorporated into chewing gum compositions. The inventive delivery systems and method of preparation solve the problems associated with wetting the surface of core materials. It particularly solves the problem of wetting the surface and thoroughly coating the needle-like structure of the dipeptide sweetener aspartame. Additionally, the coatings are flexible enough to form protective film barriers without cracking or brittleness due to mechanical forces encountered during high speed application of the coating to the core material as well as those mechanical stresses present when incorporating the delivery system into food products. The present method of stabilizing and coating the core material involves an initial formation of an agglomerate of the core material in a hydrophobic coating matrix whereby the core material is agglomerated and oriented in the matrix to facilitate a further coating or coatings with similar or the same matrix materials. The agglomerate is formed using spray congealing techniques which create an approximate eliptical or spherical shape. The agglomerate is, of course, larger in size then the individual particles, and its shape and size, as well as the composition of the matrix coating facilitate the application of the second coating. The agglomerate is screened to obtain only the desired particle size range. Agglomerates which are extremely fine, e.g., below about 200 U.S. standard mesh, are generally not useful since they are too fine to easily coat. The second coating and any additional coatings are applied using standard fluidized bed granulation techniques well known to the skilled artisan. Additionally, the inventive method involves spray congealing techniques without first forming an agglomerate. As discussed further, the spray congealing process involves feeding a molten mixture of the core material in the novel hydrophobic coating matrix of this invention through a high pressure spray nozzle, while maintaining the feed-line at a controlled temperature and adjusting the nozzle pressure to control the particle size of the spray. The resultant product takes the form of fine spherical droplets which congeal and solidify as they leave the nozzle and contact the air to form solid particles. These aggregate particles overcome the major problems associated with aspartame particles: that is, the needle-like shape is changed into a round aggregate matrix; the particle density is increased to a favorable range; and wettability is improved allowing granulation coating techniques to be effective. These particles comprise the delivery system discussed further herein.

The inventive delivery systems and compositions are useful in food products such as chewing gums, and other confectionery products, baked good, pharmaceutical preparations, beverages, tobacco and proprietary products such as toothpaste and mouthwash. Acceptable amounts may vary widely and preferably from about 0.01% to about 100% by weight of the delivery system based on the weight of the final product.

DETAILED DESCRIPTION OF THE INVENTION AND PREFERRED EMBODIMENTS

The present inventive compositions concern a chewing gum composition comprising a gum base and a stable delivery system capable of effecting a controlled release of core material comprising:
(A) at least one natural or artificial core material selected from the group consisting of amino acid based sweeteners, dipeptide sweeteners, glycyrrhizin, saccharin and its salts, acesulfame salts, cyclamates, steviosides, talin, dihyrochalcone compounds, flavoring agents and mixtures thereof; and
(B) a hydrophobic matrix consisting essentially of
  (i) lecithin; and
  (ii) an edible material having a melting point in the range of about 25° C. to about 100° C. selected from the group consisting of (a) fatty acids having an iodine value of about 1 to about 10, (b) natural waxes, (c) synthetic waxes and (d) mixtures thereof; and
  (iii) at least one diglyceride.

Lecithin is critical to the hydrophobic matrix and is believed to serve several important purposes. Most importantly, lecithin acts as a wetting agent to increase the affinity of the fat or wax to the core material surface. Fat and wax are ordinarily not compatible with certain crystalline sweeteners such as aspartame. The lecithin mediates the poor affinity between these materials and allows for uniform wetting of the aspartame surface by the fat or wax. Uniform wetting of the surface is critical to proper adherence of the hydrophobic matrix coating and to the effectiveness of the ultimate protection it provides for the core material.

Secondly, lecithin serves as a modifier of the rheological and thermal properties of the fat which lends it the capability of forming an elastic (nonbrittle) and flexible film over a wider temperature range. Ordinary fat without lecithin would result in a brittle, porous crystalline coating which would be vulnerable to rupture during processing and which would fail to uniformly wet the core material surface. Additionally, lecithin acts to modify the morphological properties of the fat or wax, as well as to increase their heat capacity, thereby retarding liquid to solid phase transitions and allowing for increased flexibility in processing conditions, e.g., the mixture can be processed in a specified temperature range for a longer period of time. The increased heat capacity plays an important role in the final delivery system since more heat will be required before the system melts down and releases the core material. Thus, at short exposures to elevated temperatures, the delivery system will be more stable than without the addition of lecithin.

The high bulk density and high surface area to weight ratio of core materials such as aspartame make them generally difficult to coat. Lecithin increases the viscosity of the fat which facilitates their incorporation.

The *Condensed Chemical Dictionary*, 9th edition, Van Nostrand Reinhold, 1977, defines lecithin as mixtures of diglycerides of fatty acids linked to the choline ester of phosphoric acid. Lecithins are classed as phosphoglycerides or phosphatides. In the instant invention, the lecithin preferably has a minimum of about 95% by weight of phosphatide present. This purity level is generally designated in commercially available lecithins as "95% acetone insolubles." The phrase "95% acetone insolubles" is intended to mean that upon dissolution of the lecithin in acetone, 95% of the lecithin (the phosphatide portion) remains insoluble. Residual impurities such as oil, moisture and soluble non-phosphatides account for the 5% of the materials dissolved and extracted by the acetone. More preferably, the lecithin employed will have 97% insolubles. Additionally, it is required that the lecithin be soluble in the fatty acid or wax. This is necessary for the lecithin to perform its various functions described above. The lecithin employed does not have a defined melting point ranges but softens prior to decomposition.

The second required constituent in the hydrophobic matrix coating of the delivery system is an edible material which is itself hydrophobic and which has a melting point in the range of about 25° C. to about 100° C. Those materials useful are selected from the group consisting of fatty acids, natural, synthetic waxes and mixtures thereof. It is important that the melting point be within the recited range since the melting point of the final delivery system product will be greatly affected by the fat or wax constituent.

Those fatty acids which are useful must have an iodine value of about 1 to about 10. The iodine value is a means of determining the degree of unsaturation in fats and oils. The measurement of iodine values are determined by known titrating methods and are reported in terms of centrigrams of iodine absorbed per gram of fat and oil sample. (*See Bailey's Industrial Oil and Fat Products*, Vol 2, 4th Ed., Swern, Daniel ed., p 436–438, 1982.) Thus, those fatty acids useful in the inventive systems have an iodine value of about 1 centigram to about 10 centigrams.

Examples of the fatty acids employed are selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil and mixtures thereof.

Those waxes which are useful include natural waxes such as animal waxes, vegetable waxes, petroleum waxes and synthetic waxes having a melting point within the range of about 25° C. to about 100° C. and being edible. Specific examples of waxes which fall within these categories are beeswax, lanolin, bayberry, sugar cane, candelilla, carnauba, paraffin, microcrystalline, petrolatum and carbowax. Mixtures of these waxes may be used as well as mixtures of the waxes with the fatty acids.

The edible fatty acid or wax materials are employed in the instant delivery systems in amounts of about 61% to about 95% by weight of the delivery system, preferably in amounts of about 63% to about 90% and most preferably in amounts of about 66% to about 80%. These amounts are necessary to adequately coat the surface of sweeteners such as aspartame which have a high surface area to weight ratio. Hydrogenated palm oil is the most preferred fatty acid. Paraffin wax and microcrystalline wax are the preferred waxes.

The edible fatty acid or wax component is critical to the effectiveness of the protective barrier. The hydrophobic matrix, of which the fatty acid or wax is an essential part, provides protection for the core material from heat, light, moisture, pH, reactive chemicals and the like. Additionally, the release of the core material is controlled via the hydrophobic matrix and can serve other purposes such as the masking of taste for unpalatable or unpleasant tasting materials.

The term glyceride component used herein refers to commonly identified glycerides which are esters of glycerol and fatty acids in which one or more of the hydroxyl groups of the glycerol have been replaced by acid radicals. Mono- and diglycerides are preferred, whereas triglycerides alone are not acceptable.

The mono- or diglyceride component of the hydrophobic coating matrix serves to increase the affinity between the fatty acid or wax and the core material. In addition, for core materials which are water soluble such as aspartame, the mono- or diglyceride component also serves to help the fat adhere and wet the sweetener surface. Flexibility and elasticity of the matrix once it forms the film or coating on the core material is increased due to the glyceride component.

The glycerides are present in amounts of about 0.5 to about 20% by weight of the delivery system. Preferably the glyceride is used in amounts of about 0.5 to about 7% and most preferably about 1% to about 3%. It should be recognized that mixtures of mono- and diglycerides may be used, since most available glyceride materials are mixtures of mono- and diglycerides.

The core material can be selected from a wide variety of materials such as sweeteners, medicaments, drugs, flavoring agents and the like. These materials can be used either singly or in combination in either a single or multiple delivery system. That is, one or more of these materials may be present within one coating matrix or separately coated by the matrix and employed alone or in combination in a final product.

The sweetener component may be selected from solid natural or synthetic sweeteners capable of imparting high intensity sweetness. These sweeteners are selected from the group consisting of amino acid based sweeteners, dipeptide sweeteners, glycyrrhizin, saccharin and its salts, acesulfame salts, cyclamates, steviosides, talin, dihydrochalcone compounds and mixtures thereof.

The sweeteners may be used in amounts necessary to impart sweetness and preferably in amounts of about 0.01 to about 30% by weight of the delivery system. Aspartame, saccharin and its salts are the preferred sweeteners and may be used in amounts of about 0.01% to about 25% and about 0.01% to 50% respectively, by weight of the delivery system. The preferred amounts of these sweeteners are about 2 to about 10%, most preferably about 4 to about 6%.

A particularly effective combination of sweeteners is aspartame, sodium saccharin and acesulfame K (potassium acesulfame). Saccharin and its salts and acesulfame salts may be employed in amounts of about 5 to about 50% by weight. Aspartame is used in amounts up to about 15% by weight when used in this combination. One or more of the sweeteners may be in the encapsulated form prior to incorporation in the delivery system, thus delaying the release of the sweetener and lengthening the perceptible sweetness and/or staggering their release. Thus, the sweeteners may be incorporated such that they release sequentially.

It has also been discovered that the incorporation of the combination of two or more sweeteners used, alone or in the delivery system improves the sweetness intensity and prolongs the sweetness release. This sweetness improvement is the result of synergism. Exemplary examples of synergistic combinations are: saccharin/aspartame; saccharin/potassium acesulfame; saccharin/aspartame/potassium acesulfame. These sweeteners can also be added to the final food product independently of the delivery system. Thus, a food product may have sweetness imparted thereto attributable to the delivery system sweetness as well as those sweeteners independent of the delivery system. These combinations of sweeteners have also been discovered to impart a long lasting flavor effect to the food product such as chewing gum.

Useful flavoring agents may be chosen from synthetic flavoring liquids and/or liquids derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

The method of preparing the delivery system involves first forming an agglomeration of the core material and the hydrophobic matrix. The agglomerates are then screened to obtain particles of about 200 to about 30 mesh and then coated with one or more layers of hydrophobic material to provide a protective barrier. The agglomerate is formed by mixing at low shear the fatty acid or wax with the glyceride and lecithin at temperatures of about 75° to about 95° C. until a homogeneous mixture is obtained. The core material or combination of core materials are then added to this mixture and mixed at high shear to uniformly dispense the material in the mixture. The dispersion is then fed into a heat controlled spray nozzle and spray congealed. The term spray congealing as used herein refers to the solidification of the atomized liquid droplets which cool and solidify upon hitting the cooler temperature of the surrounding atmosphere. The nozzle pressure is regulated to control the particle droplet size. The droplets cool and congeal once they are emitted from the nozzle and contact the cooler environment. The result is a dry particle or agglomerate having an approximate eliptical or spherical shape. At this stage, core material particles are bound together with the hydrophobic matrix, but not adequately coated to fully protect the core material from the environment. The agglomerated particles are then screened to the desired size as mentioned above. The second coating step of the process is now necessary to provide the required protective barrier. Thus, the agglomerate is then coated using standard fluidized bed granulation procedures.

The second coating (e.g., the coating of the agglomerate) may use the hydrophobic matrix. It should be mentioned, however, that the outer coating need not have the lecithin and glyceride components present since wetting of the core material surface is not critical at this point, having been accomplished in the first coating. Thus, the outer coating need only have the fatty acid and wax component and preferably both. Preferably the outer coating comprises hydrogenated palm oil and paraffin wax in respective amounts of about 61% to about 90% and about 10% to about 40%. The final product is a fine dry particle and is referred to herein as the delivery system. The delivery system preferably has a melting range of about 20° C. to about 90° C. and most preferably a melting range of about 35° to about 38° C., such that it melts and releases the core material within the normal body temperature range of humans.

As an alternative, but less preferred method, the homogenous mixture of the hydrophobic matrix and core material can be allowed to cool in sheets and subsequently pulverized to a particle size of about 30 to about 200 U.S. standard mesh size (about 600 to about 75 microns). The pulverized particles can then be coated with the hydrophobic mixture using standard fluidized bed granulation techniques. An additional alternative method of forming the delivery system comprises spray drying the core material with a known binder such as cellulose or polyvinyl pyrrolidone and the like to form an aggregate. The aggregate is then coated with the hydrophobic coating matrix using conventional fluidized bed granulation techniques well known to the skilled artisan. These alternative methods however are not as effective in preparing the delivery systems as the preferred method.

It is important to note that the preferred inventive process involving spray congealing of the liquid hydrophobic coating matrix-core material followed by fluidized bed granulation results in a significantly and surprisingly improved coating for protection of the core material. Either spray congealing or fluidized bed granulation alone do not provide adequate protective coatings for the delivery system and results in instability and premature release of the core material. The congealing step forms an agglomerate of the core material and hydrophobic matrix. The matrix binds together the core particles but only partially coats the core. The core material is "randomly" coated in the sense that it is pure chance that the matrix completely coats or enrobes the material particularly if the material is difficult to coat.

Fluidized bed granulation is necessary to achieve the uniform coating necessary to protect the core material. For example, with rod-like or needle-like shaped sweeteners such as aspartame, the spray congealing orients the aspartame crystals into an agglomeration which is significantly easier to coat, e.g., the agglomerate approximates an eliptical or spherical shape (see FIG. 2), which is then easily uniformly coated in the fluidized bed. Fluidized bed coating alone of sweeteners such as aspartame does not provide a uniform protective coating.

The effectiveness of the protective barrier or coating afforded by the hydrophobic matrix to the core material is dependent not only on the completeness of the surface area coated, but also on the thickness of the coating. The external hydrophobic matrix thickness is approximated as a function of the total amount of hydrophobic matrix present as follows:

| Coating* | Thickness** | Dissolution*** |
|---|---|---|
| 300% | 29 | N.D. (not detectable) |
| 200% | 22 | N.D. |
| 100% | 13 | N.D. |
| 50% | 7 | 0.3% |
| 30% | 3 | 7.57% |
| 0% | 0 | 17.64 |

*percentage of outer coating of hydrophobic matrix by weight of the intermediate agglomerate.
**indicates the relative thickness of the outer coating over the agglomerate as a percentage of the diameter of the agglomerate itself.
***delivery system placed in water at 25° C. for 1 hour. Percentage indicates the amount of aspartame extracted by water.

As evidenced in the above table, the thickness of the exterior, secondary coating (e.g., the fluidized bed coating of the agglomerate) is greater when a higher weight percentage of coating is used. The thicker coating maximizes the protection of the core material, in this case aspartame.

A balance must be maintained, however, such that too thick a coating is not used so as to prevent proper release of the core material. It has been determined that using the exterior coating in amounts of about 200 to about 300% by weight of the agglomerate maximizes the protective benefits with the controlled release benefits. Use of the exterior coating in less than amounts of about 30% by weight of the agglomerate does not provide thickness sufficient for protection of the core material. As evidenced by the table above, the less coating used the lower the coating thickness and the higher the dissolution of the core material (sweetener) from the delivery system, as indicated by the dissolution values. These values were determined by stirring a specified amount of the delivery system in water at 25° C. for 1 hour. The amount of core material (sweetener) dissolved by the water was then measured and used as an indicator of the effectiveness of the coating as a moisture barrier. As the values indicate, no sweetener (aspartame) was detectable in the water where the coating was greater than 200% by weight of the agglomerate. This indicates the coating thickness and uniformity was extremely effective in preventing moisture from penetrating and reacting with the aspartame. Coatings which were 30% or less by weight of the agglomerate showed significant percentages of aspartame detected by the dissolution assay, indicating penetration of the water through the coating. When no coating was used on the agglomerate, significant dissolution of the aspartame occurred.

The delivery system is its final form is a dry spherical particulate having an ASTM (U.S. standard) mesh size of about 200 to about 30 and preferably about 150 to about 70.

The delivery system can be used to protect materials such as sweeteners, flavoring agents, and the like.

With regard to the chewing gum formulation in which the novel delivery system is employed, the amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of α-pinene or β-pinene; terpene resins including polyterpene and mixtures thereof. The solvent may be employed in an amount ranging from about 10% to about 75% and preferable about 45% to about 70% by weight to the gum base.

A variety of traditional ingredients such as plasticizers or softeners such as lanolin, stearic acid, sodium stearate, potassium stearate, glyceryl triacetate, glycerine and the like for example, natural waxes, petroleum waxes, such as polyurethene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include the conventional additives of flavoring agents, coloring agents such as titanium dioxide; emulsifiers such as lecithin and glyceryl monostearate; and additional fillers such as aluminum hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum.

In the instance where auxiliary sweeteners are utilized in addition to those in the delivery system, the present invention contemplates the inclusion of those sweeteners well known in the art, including both natural and artificial sweeteners. Thus, additional sweeteners may be chosen from the following non-limiting list: sugars such as sucrose, glucose (corn syrup), dextrose, invert sugar, fructose, and mixtures thereof; saccharine and its various salts such as the sodium or calcium salt; cyclamic acid and its various salts such as the sodium salt; the dipeptide sweeteners such as aspartame; dihydrochalcone compounds; glycyrrhizin; *Stevia rebaudiana* (Stevioside); and sugar alcohols such as sorbitol, sorbitol syrup, mannitol, xylitol, and the like. Also contemplated as an additional sweetener is the nonfermentable sugar substitute (hydrogenated starch hydrolysate) which is described in U.S. Pat. No. Re. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Pat. No. 2,001,017.7.

Suitable flavorings include both natural and artificial flavors, and mints such as peppermint, menthol, artificial vanilla, cinnamon, various fruit flavors, both individual and mixed, and the like are contemplated. The flavorings are generally utilized in amounts that will vary depending upon the individual flavor, and may, for example, range in amounts of about 0.5% to about 3% by weight of the final chewing gum composition weight. The flavorings may be present in the delivery system, in the chewing gum composition itself, or both.

The colorants useful in the present invention, include the pigments such as titanium dioxide, that may be incorporated in amounts of up to about 1% by weight, and preferably up to about 0.6% by weight. Also, the colorants may include other dies suitable for food, drug and cosmetic applications, and known as F.D. & C. dyes and the like. The materials acceptable for the foregoing spectrum of use are preferably water-soluble. Illustrative examples include indigoid die, known as F.D. & C. Blue No. 2, which is the disodium salt of 5,5'-indigotindisulfonic acid. Similarly, the dye known as F.D. & C. Green No. 1, comprises a triphenylmethane dye and is the monosodium salt of 4-[4-Nethyl-p-sulfobenzylamino)diphenylmethylene]-[1-(N-ethyl-N-p-sulfoniumbenzyl)-2,5-cyclohexadienimine]. A full recitation of all F.D. & C. and D. & C. and their corresponding chemical structures may be found in the Kirk-Othmer Encyclopedia of Chemical Technology, in Volume 5, at Pages 857–884, which text is accordingly incorporated herein by reference.

The chewing gums of the invention may be in any form known in the art, such as stick gum, slab gum, chunk gum, shredded gum, hard coated gum, tabletted gum, as well as center-filled gum.

The process of preparing the inventive chewing gum compositions is as follows. The gum base is melted (about 85° to about 90°), cooled to 78° C. and placed in a pre-warmed (60° C.) standard mixing kettle equipped with sigma blades. The lecithin is added and mixed. Next, a portion of the sorbitol and the glycerin is added and mixed for an additional 3 to 6 minutes. The mixing kettle is coded and the mannitol and the remainder of the sorbitol and glycerin are then added and mixing is continued. At this time, the unflavored chewing gum temperature is about 39°–42° C. Flavor oil is then added and incorporated into the base and the mixing is continued. Finally, the delivery system containing the core material is added and mixed for an additional 1 to 10 minutes. The delivery system is added as the last ingredient. The final gum temperature is about 39° C.–43° C. The chewing gum composition is then discharged from the kettle, rolled, scored and formed into chewing gum pieces.

The following examples serve to provide further appreciation of the invention but are not meant in any way to restrict the effective scope of the invention. All percentages throughout the specification are by weight % of the final delivery system unless otherwise indicated.

EXAMPLE ONE

This example demonstrates the preferred novel delivery system composition and method of preparation. A mixture of 333.3 grams of hydrogenated palm oil, and 41.7 grams of monoglyceride were melted at a temperature of about 85° C. To this mixture 41.7 grams of lecithin was added and mixed until it dissolved. At this point the mixture is homogeneous. Next 83.3 grams of aspartame is added and mixed at high shear to obtain a uniform dispersion of the sweetener. The molten mixture is then fed into a heat controlled high pressure nozzle and sprayed under controlled pressure to obtain a particle droplet size of about 160 to about 30 U.S. standard mesh. Particles outside this size range were screened-out. The droplets congealed upon contact with the cooler atmosphere, forming a dry powder material. This powder is the agglomerate referred to herein. The agglomerate is then coated with a molten mixture of 1275 grams of hydrogenated palm oil and 225 grams of paraffin wax using standard fluidized bed granulation techniques. A Glatt GPC-15 fluidized bed granulator is used. The inlet temperature of the molten mixture is about 55° to about 65° C. and the outlet temperature is about 35° to about 40° C. The rate of spray is about 80 milliliters per minute at a pressure of about 3 bar. The spray is directed into a stream of aspartame suspended in an apparatus that creates a strong upward air current in which the sweetener moves. The stream of aspartame passes through a zone of the finely atomized droplets of the molten coating material, after which the thus coated particles pass out of the upward stream and pass downward in a fluidized condition counter current to the flow of heated fluidized gas whereupon they are dried, and may re-enter the upward moving coating zone for a subsequent discrete coating application. The foregoing method and associated apparatus are known as the Wurster Process. This process is set forth in detail in U.S. Pat. No. 3,089,824; U.S. Pat. Nos. 3,117,027, 3,196,827, 3,241,520 and 3,253,944.

The resultant sweetener delivery system is a dry powder.

EXAMPLE TWO

The inventive sweetener delivery system was formed using the procedure of Example One whereby 300 grams of rapeseed oil, 30 grams of the monoglyceride, 50 grams of lecithin and 40 grams of aspartame were used. The agglomerate was formed in the same manner as Example one and then coated using the fluidized bed technique with a molten mixture of 400 grams of hydrogenated palm oil and 100 grams of paraffin wax.

EXAMPLE THREE

The procedure of Example two was repeated using the same amounts for making the agglomerate. The secondary fluidized bed coating, however, was carried out using the molten mixture of 380 grams of rapeseed oil and 120 grams of microcrystalline wax.

EXAMPLE FOUR

By way of comparison, the procedure of EPA No. 81110320.9 referred to above, was carried out omitting the polysaccharide component in order to properly compare it with the inventive process. A molten mixture of 120 grams of hydrogenated palm oil, 20 grams of monoglyceride, 20 grams of lecithin and 30 grams of aspartame was prepared in accordance with the procedures of Example One of the reference. The mixture was cooled to obtain a solidified mass and then pulverized to obtain the final encapsulated product.

The product was then photographed under a microscope 145X and presented in FIG. 4. As the photograph clearly shows the irregular and random nature of the coating. This is to be compared with the results of the spray congealing-fluidized bed process of applicants as shown in the FIG. 3 photograph. FIG. 3 clearly depicts spherical-like uniform coatings of the instant invention having the agglomerate coated with 200% of the secondary coating by weight of the aggregate.

EXAMPLE FIVE

The procedure of Example One was repeated using the same ingredients and amounts only 83 grams of saccharin was used to replace the aspartame.

EXAMPLE SIX

The procedure of Example One was repeated using the same ingredients except the sweetener comprised 12.5 grams of aspartame and 70.5 grams of saccharin.

EXAMPLE SEVEN

A chewing gum composition containing the novel delivery system wherein the core material is aspartame, was prepared with the formulation set forth below, employing conventional gum making techniques.

| Ingredient | Parts by Weight |
| --- | --- |
| Gum Base | 23 |
| Glycerin | 15 |
| Lecithin | 0.5 |
| Mannitol | 8.0 |
| Sorbitol Powder | 49.2 |
| Delivery System of Example One (containing aspartame) | 2.1 |
| Spearmint Flavor | 1.2 |

The gum base is melted (85°–90°), cooled to 78° and placed in a pre-warmed (60° C.) standard mixing kettle equipped with sigma blades. The lecithin is added and mixed for 2 minutes. Next, add ⅔ sorbitol and ½ glycerin and mix for an additional 4½ minutes. Cool the mixing kettle by means of turning on the cold water circular in the kettle. The mannitol, ⅓ sorbitol and ½ glycerin are then added and mixing is continued for about 4 minutes. At this time, the unflavored chewing gum temperature is about 39°–42° C. Flavor oil is then added and incorporated into the base and the mixture is mixed for about an additional 3 minutes. Finally, the delivery system containing aspartame is added and an additional 3 minutes of mixing is conducted. The final gum temperature is about 39° C.–43° C. The chewing gum composition is then discharged from the kettle and formed into strips having a thickness of 0.18 centimeters and cooled to room temperature.

In order to evaluate the chewing gum formulation of this example, a comparison was undertaken with the identical gum formulation (Control A) prepared without the inventive delivery system using free aspartame powder.

The compositions were subjected to sweetener chew-out studies using a group of five expert panelists who chewed samples of the chewing gums for 15 minutes. The amount of sweetener remaining in the bolus after the chew time was determined using high pressure liquid chromatography (HPLC). The results set forth in Table I demonstrate the control-released sweetener extraction achieved with the inventive compositions.

The stability of the chewing gum compositions containing the novel delivery system was tested. Aspartame was the core material present. Some samples of the chewing gum were stored at 37° C., others were stored at room temperature for various time periods. At designated intervals the samples were assayed by HPLC for the presence of aspartame. The amount of aspartame detected indicates the protective capability of the novel delivery system against moisture, temperature and pH changes. The results are shown in Table II below.

EXAMPLE EIGHT

This example demonstrates the preparation of a chewing gum composition wherein the novel delivery system contains the combination of aspartame and saccharin as the core materials (The delivery system of Example Six was used).

| Ingredient | Parts by Weight of the chewing gum composition |
|---|---|
| Gum Base | 24.0 |
| Glycerin | 15 |
| Lecithin | 0.5 |
| Mannitol | 8.0 |
| Sorbitol Powder | 45.7 |
| Delivery System of Example Six (containing aspartame and saccharin) | 3.6 |
| Spearmint Flavor | 1.2 |

The chewing gum preparation method in Example Seven was followed. Samples of the chewing gum were assayed prior to determining the actual sweetener content of the delivery system. Chew-out studies were conducted whereby the gum pieces were chewed for about 15 minutes. Each bolus was collected and assayed for the amount of sweetener present. The amount of sweetener extracted during chewing was then determined. As Table I indicates, the inventive delivery system exhibited controlled release of the sweetener as evidenced by having 67% of the sweetener extracted during chewing. This is significantly improved over the prior art (Control A, B and Example Nine) where all (100%) of the sweetener was extracted during chew.

Stabilities of the aspartame in the delivery system were also investigated. Data shown in Table II clearly indicates the superiority of the inventive chewing gum compositions over the prior art with regard to stability.

EXAMPLE NINE

This example is intended to be a comparison using the composition outlined in EPA No. 81110320.0 (see Example 4), in a chewing gum product. The chewing gum composition of Example Seven was used with 850 ppm of aspartame as the core material. As indicated in Tables I and II, this reference yields results which are inferior to the inventive compositions in terms of controlled sweetener release and stability.

EXAMPLE TEN

This example demonstrates the purpose of the inventive chewing gum compositions having saccharin as the core material (see Example Five).

| Ingredient | Parts by Weight |
|---|---|
| Gum Base | 24.2 |
| Glycerin | 5.0 |
| 70% Sorbitol Solution | 25 |
| Lecithin | 0.5 |
| Mannitol | 8.0 |
| Sorbitol Powder | 31.7 |
| Delivery System of Example Five (containing saccharin) | 2.4 |
| Cinnamon Flavor | 1.2 |

The chewing gum preparation method was the same as in Example Seven. The sorbitol solution and glycerin are pre-mixed and added to the gum mixture in the conventional manner. In order to evaluate the chewing gum compositions prepared in this example, a control gum formulation was also prepared (Control B) using the identical ingredients except free saccharin powder was substituted for the delivery system. Saccharin chew-out studies were again conducted using a group of five expert panelists who chewed the samples of gum for 15 minutes. The amount of sweetener remaining after the chew time was determined by HPLC. The results set forth in Table I again demonstrate the slow-released sweetener extraction achieved with the inventive compositions in direct contrast with the prior art.

TABLE I

| Chewing Gum Sample | Sweetener | % Sweetener Extracted After 15 Minutes |
|---|---|---|
| Control A (prior art) | Aspartame | 100 |
| Example Seven (inventive) | Aspartame | 64 |
| Example Eight (inventive) | Aspartame/Saccharin | 67 |
| Example Nine (prior art) | Aspartame | 100 |
| Control B (prior art) | Saccharin | 100 |
| Example 10 (inventive) | Saccharin | 62 |

TABLE II

| Chewing Gum Sample | Theory* | Initial** | Aspartame Levels (PPM) | | | | | | | |
|---|---|---|---|---|---|---|---|---|---|---|
| | | | 1 Wk. | | 2.5 Wks. | | 4 Wks. | | 10 Wks. | |
| | | | RT | 37° C. | RT | 37° C. | RT | 37° C. | RT | 37° C. |
| Control A | 850 | 832 | 730 | 420 | 570 | 220 | 437 | — | 280 | — |
| Example | 850 | 840 | 842 | 837 | 845 | 834 | 822 | 841 | 835 | 830 |

TABLE II-continued

| Chewing Gum Sample | Theory* | Initial** | Aspartame Levels (PPM) | | | | | | | |
|---|---|---|---|---|---|---|---|---|---|---|
| | | | 1 Wk. | | 2.5 Wks. | | 4 Wks. | | 10 Wks. | |
| | | | RT | 37° C. | RT | 37° C. | RT | 37° C. | RT | 37° C. |
| Seven Example Eight | 226 | 224 | 222 | 218 | 220 | 215 | 201 | 211 | 206 | 204 |
| Example Nine | 850 | 816 | 782 | 590 | 667 | 353 | 516 | 108 | 389 | — |

*Amount of aspartame calculated to be in the chewing gum product from the novel delivery system.
**Amount of aspartame found in the chewing gum product by assay.
Refers to Room Temperature.

The invention being thus described, it will be obvious that the same may be varied in many ways. Such variations are not to be regarded as a departure from the spirit and scope of the invention and all such modifications are intended to be included within the scope of the following claims.

What is claimed is:

1. A chewing gum composition comprising a gum base and an agglomerated stable sweetener delivery system capable of effecting a controlled release of the sweetener comprising:
   (A) at least one solid natural or artificial high intensity sweetener selected from the group consisting of amino acid based sweeteners, dipeptide sweeteners, glycyrrhizin, saccharin and its salts, acesulfame salts, cyclamates, steviosides, talin, dihydrochalcone compounds and mixtures thereof; and
   (B) a hydrophobic matrix consisting essentially of
       (i) lecithin; and
       (ii) an edible material having a melting point in the range of about 25° C. to about 100° C. selected from the group consisting of (a) fatty acids having an iodine value of about 1 to about 10, (b) natural waxes, (c) synthetic waxes and (d) mixtures thereof; and
       (iii) at least one glyceride.

2. The chewing gum composition of claim 1 wherein the sweetener is present in amounts of about 0.01% to about 50% by weight of the delivery system.

3. The chewing gum composition of claim 1 wherein the sweetener comprises aspartame in the amount of about 0.01% to about 25% by weight of the delivery system.

4. The chewing gum composition of claim 1 wherein the sweetener comprises saccharin and its salts in the amount of about 0.01% to about 50% by weight of the delivery system.

5. The chewing gum composition of claim 1 wherein the sweetener is a combination of up to about 25% of aspartame and about 1.0% to about 50% of saccharin and its salts by weight of the delivery system.

6. The chewing gum composition of claim 5 wherein the sweetener additionally contains about 0.1% to about 50% of potassium acesulfame by weight of the delivery system.

7. The chewing gum composition of claim 1 wherein the purity of lecithin is at least 95% acetone insoluble.

8. The chewing gum composition of claim 7 wherein the lecithin is soluble in the edible material of the hydrophobic matrix.

9. The chewing gum composition of claim 1 wherein the fatty acid is selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil and mixtures thereof.

10. The chewing gum composition of claim 9 wherein the fatty acid is present in amounts of about 61% to about 95% by weight of the delivery system.

11. The chewing gum composition of claim 9 wherein the fatty acid is refined hydrogenated palm oil present in amounts of about 63% to about 90% by weight of the delivery system.

12. The chewing gum composition of claim 9 wherein the monoglyceride or diglyceride is present in amounts of about 0.5% to about 20% by weight of the delivery system.

13. The chewing gum composition of claim 12 wherein the monoglyceride is a distilled monoglyceride present in amounts of about 1% to about 3% by weight of the delivery system.

14. The chewing gum composition of claim 12 wherein the lecithin is present in amounts of about 0.5% to about 9%.

15. The chewing gum composition of claim 13 having a melting point in the range of about 45° C. to about 70° C.

16. The chewing gum composition of claim 1 wherein the gum base comprises an elastomer selected from the group consisting of natural rubber, synthetic rubber and mixtures thereof.

17. The chewing gum composition of claim 16 wherein the gum base elastomer is selected from the group consisting of chicle, jelutong, balata, gutta-percha, lechi-capsi, sorva, butadiene-styrene copolymers, polyisobutylene, isobutylene-isoprene copolymers, polyethylene, polyvinylacetate, and mixtures thereof.

18. The chewing gum composition of claim 17 wherein the gum base is present in the amounts of about 5% to about 45% by weight of the final chewing gum composition.

19. The chewing gum composition of claim 1 wherein there is additionally included fillers, coloring agents, flavoring agents, softeners, plasticizers, elastomers, elastomer solvents, sweetening agents and mixtures thereof.

20. The chewing gum composition of claim 1 wherein the delivery system additionally contains a flavor agent.

21. The chewing gum composition of claim 20 wherein the flavor agent is selected from the group consisting of spearmint oil, cinnamon oil, oil of wintergreen (methylsalicylate), peppermint oil, lemon oil, orange oil, grape oil, lime oil, grapefruit oil, apple essence, strawberry essence, cherry essence, pineapple essence, bananna oil and mixtures thereof.

22. A method of preparing a chewing gum composition having improved sustained sweetener release properties which comprises:

(1) Preparing a sweetener delivery system wherein the core material is protected by a matrix coating prepared by the process comprising:

(A) forming an agglomerate of a sweetener in a hydrophobic matrix coating comprising the steps of melting the hydrophobic matrix coating and dispersing the sweetener uniformly therein; feeding the dispersion into a heat controlled high pressure spray nozzle; atomizing the dispersion under controlled pressure to maintain the particle size between about 200 to about 30 mesh; collecting the congealed, dry spherical particles; and (B) coating the agglomerated particles by suspending the particles in a stream of air passing through a zone of atomized droplets of a second hydrophobic material;

(2) Adding the resultant delivery system to a homogeneous mixture of a gum base and remaining chewing gum ingredients; and (3) Forming the resultant mixture into suitable chewing gum shapes.

23. The method of claim 22 wherein the sweetener delivery system is added as a last step in the chewing gum composition at a temperature of about 39° to about 43° C.

* * * * *